US012596819B2

(12) United States Patent
Blaikie, III et al.

(10) Patent No.: US 12,596,819 B2
(45) Date of Patent: Apr. 7, 2026

(54) METHOD AND SYSTEM FOR DATA VALUATION AND SECURE COMMERCIAL MONETIZATION PLATFORM

(71) Applicant: Datavault AI Inc., Beaverton, OR (US)

(72) Inventors: Alfred Blair Blaikie, III, Tinton Falls, NJ (US); Nathaniel T. Bradley, Tucson, AZ (US); Joshua S. Paugh, Tucson, AZ (US)

(73) Assignee: Datavault AI Inc., Beaverton, OR (US)

( * ) Notice: Subject to any disclaimer, the term of this patent is extended or adjusted under 35 U.S.C. 154(b) by 101 days.

(21) Appl. No.: 17/291,411

(22) PCT Filed: Nov. 5, 2019

(86) PCT No.: PCT/US2019/059920
§ 371 (c)(1),
(2) Date: May 5, 2021

(87) PCT Pub. No.: WO2020/097115
PCT Pub. Date: May 14, 2020

(65) Prior Publication Data
US 2021/0365574 A1     Nov. 25, 2021

Related U.S. Application Data

(60) Provisional application No. 62/908,252, filed on Sep. 30, 2019, provisional application No. 62/845,057, (Continued)

(51) Int. Cl.
G06F 21/62     (2013.01)
G06Q 20/04     (2012.01)
H04L 9/08     (2006.01)

(52) U.S. Cl.
CPC ....... *G06F 21/6209* (2013.01); *G06Q 20/047* (2020.05); *H04L 9/088* (2013.01)

(58) Field of Classification Search
CPC .... G06F 21/6209; G06Q 20/047; H04L 9/088
See application file for complete search history.

(56) References Cited

U.S. PATENT DOCUMENTS 7,177,426 B1 *   2/2007   Dube .................. G06F 21/6209
                                                          380/46
9,794,074 B2   10/2017   Toll et al.
(Continued)

FOREIGN PATENT DOCUMENTS

CN     108537664 A     9/2018
EP     3396608 A1     10/2018
(Continued)

OTHER PUBLICATIONS

International Search Report & Written Opinion, PCT/US19/59920, Jan. 21, 2021, 13 pages.
(Continued)

*Primary Examiner* — Vance M Little
(74) *Attorney, Agent, or Firm* — Goodhue, Coleman & Owens, P.C.

(57) ABSTRACT

A system, method, and platform for monetizing data. A selection is received from a user to monetize a data object associated with the user. Data associated with the data object is compiled. A security token is generated referencing the data. The data object is monetized utilizing the security token in accordance with the selection.

20 Claims, 8 Drawing Sheets

Related U.S. Application Data filed on May 8, 2019, provisional application No. 62/826,457, filed on Mar. 29, 2019, provisional application No. 62/755,815, filed on Nov. 5, 2018.

(56)                    References Cited

U.S. PATENT DOCUMENTS

| | | | |
|---|---|---|---|
| 9,870,562 | B2 | 1/2018 | Davis et al. |
| 10,114,969 | B1 | 10/2018 | Chaney et al. |
| 10,163,129 | B1 | 12/2018 | Agarwal et al. |
| 10,171,476 | B2 | 1/2019 | Khan |
| 10,255,641 | B1 | 4/2019 | Goldman |
| 10,318,979 | B2 | 6/2019 | Frank et al. |
| 10,341,105 | B2 | 7/2019 | Innes et al. |
| 10,346,826 | B2 | 7/2019 | Boudville |
| 10,361,849 | B2 | 7/2019 | Smith et al. |
| 11,269,665 | B1 | 3/2022 | Podgorny |
| 2002/0077978 | A1* | 6/2002 | O'Leary ............... G06Q 20/10 705/40 |
| 2004/0128253 | A1 | 7/2004 | Jim |
| 2007/0250700 | A1 | 10/2007 | Sidhu et al. |
| 2007/0288312 | A1 | 12/2007 | Wang |
| 2009/0157534 | A1 | 6/2009 | Arsiwala |
| 2009/0240569 | A1 | 9/2009 | Ramer et al. |
| 2011/0208621 | A1 | 8/2011 | Feierstein |
| 2011/0295988 | A1* | 12/2011 | Le Jouan ............... G06F 21/31 709/223 |
| 2012/0084349 | A1 | 4/2012 | Lee et al. |
| 2012/0323718 | A1 | 12/2012 | Shkedi |
| 2013/0132300 | A1 | 5/2013 | Margolis |
| 2013/0230138 | A1* | 9/2013 | Jeter ................... G01N 23/223 378/45 |
| 2014/0164251 | A1 | 6/2014 | Loh |
| 2014/0214636 | A1 | 7/2014 | Rajsky |
| 2014/0344015 | A1 | 11/2014 | Puértolas-Montañés et al. |
| 2015/0088598 | A1* | 3/2015 | Acharyya ............. G06Q 30/00 705/7.29 |
| 2015/0379510 | A1 | 12/2015 | Smith |
| 2016/0104153 | A1 | 4/2016 | Anderson |
| 2016/0267552 | A1* | 9/2016 | Chandra ............ G06Q 30/0255 |
| 2016/0342977 | A1 | 11/2016 | Lam |
| 2017/0011460 | A1 | 1/2017 | Molinari et al. |
| 2017/0111345 | A1 | 4/2017 | Heiman |
| 2017/0126644 | A1 | 5/2017 | Ullrich et al. |
| 2017/0134161 | A1 | 5/2017 | Goeringer et al. |
| 2017/0169363 | A1 | 6/2017 | Salmasi et al. |
| 2017/0206523 | A1 | 7/2017 | Goeringer et al. |
| 2017/0214522 | A1 | 7/2017 | Code et al. |
| 2017/0221029 | A1 | 8/2017 | Lund et al. |
| 2017/0230109 | A1 | 8/2017 | Kawai |
| 2017/0277774 | A1* | 9/2017 | Eigner ............... G06Q 30/0204 |
| 2017/0295023 | A1 | 10/2017 | Madhavan et al. |
| 2017/0301031 | A1 | 10/2017 | Naqvi |
| 2017/0316410 | A1 | 11/2017 | Smith et al. |
| 2017/0317997 | A1 | 11/2017 | Smith et al. |
| 2017/0330174 | A1 | 11/2017 | DeMarinis et al. |
| 2017/0337534 | A1 | 11/2017 | Goeringer et al. |
| 2017/0346833 | A1 | 11/2017 | Zhang |
| 2017/0372278 | A1 | 12/2017 | Frolov et al. |
| 2018/0101771 | A1 | 4/2018 | Schwarm |
| 2018/0144153 | A1* | 5/2018 | Pead ...................... H04L 63/102 |
| 2018/0144340 | A1 | 5/2018 | Kinnaird et al. |
| 2018/0158162 | A1 | 6/2018 | Ramasamy |
| 2018/0218456 | A1 | 8/2018 | Kolb et al. |
| 2018/0225693 | A1 | 8/2018 | Postrel |
| 2018/0253725 | A1 | 9/2018 | Smith et al. |
| 2018/0262493 | A1 | 9/2018 | Andrade |
| 2018/0276626 | A1 | 9/2018 | Laiben |
| 2018/0300693 | A1 | 10/2018 | Gopinath et al. |
| 2018/0351949 | A1 | 12/2018 | Scott et al. |
| 2018/0365686 | A1 | 12/2018 | Kondo |
| 2019/0019208 | A1 | 1/2019 | Postrel |
| 2019/0019218 | A1 | 1/2019 | Thompson et al. |
| 2019/0026828 | A1 | 1/2019 | Preston et al. |
| 2019/0043050 | A1 | 2/2019 | Smith et al. |
| 2019/0050926 | A1 | 2/2019 | Cooper |
| 2019/0052722 | A1 | 2/2019 | Gasking |
| 2019/0058580 | A1 | 2/2019 | Tormasov et al. |
| 2019/0066205 | A1 | 2/2019 | Marks |
| 2019/0066206 | A1 | 2/2019 | Marks |
| 2019/0080402 | A1 | 3/2019 | Molinari et al. |
| 2019/0080407 | A1 | 3/2019 | Molinari et al. |
| 2019/0087844 | A1* | 3/2019 | Leekley ............... G06Q 20/065 |
| 2019/0087893 | A1 | 3/2019 | Pellew |
| 2019/0102454 | A1 | 4/2019 | Sato et al. |
| 2019/0102837 | A1 | 4/2019 | Smith et al. |
| 2019/0114706 | A1 | 4/2019 | Bell et al. |
| 2019/0121813 | A1 | 4/2019 | Galebach et al. |
| 2019/0122243 | A1 | 4/2019 | Mizzone |
| 2019/0122258 | A1 | 4/2019 | Bramberger et al. |
| 2019/0139136 | A1 | 5/2019 | Molinari et al. |
| 2019/0141048 | A1 | 5/2019 | Fallah et al. |
| 2019/0147471 | A1 | 5/2019 | McKelvey et al. |
| 2019/0147532 | A1 | 5/2019 | Singh et al. |
| 2019/0149633 | A1 | 5/2019 | Evans et al. |
| 2019/0155997 | A1 | 5/2019 | Vos et al. |
| 2019/0156304 | A1 | 5/2019 | Hudson et al. |
| 2019/0156363 | A1 | 5/2019 | Postrel |
| 2019/0163700 | A1 | 5/2019 | Baumgardner et al. |
| 2019/0164140 | A1 | 5/2019 | Pasupula |
| 2019/0164152 | A1 | 5/2019 | Bucher |
| 2019/0172067 | A1 | 6/2019 | Arora et al. |
| 2019/0172153 | A1 | 6/2019 | Wyle |
| 2019/0180266 | A1 | 6/2019 | Sidhu |
| 2019/0180307 | A1 | 6/2019 | Cohen et al. |
| 2019/0180329 | A1 | 6/2019 | Chetlur et al. |
| 2019/0182257 | A1 | 6/2019 | Lee et al. |
| 2019/0188411 | A1 | 6/2019 | Kroutik |
| 2019/0205563 | A1 | 7/2019 | Gonzales |
| 2019/0205932 | A1 | 7/2019 | Ericson |
| 2019/0213633 | A1 | 7/2019 | Kokernak |
| 2019/0220836 | A1 | 7/2019 | Caldwell |
| 2019/0222418 | A1 | 7/2019 | O'Brien et al. |
| 2019/0228409 | A1 | 7/2019 | Madisetti et al. |
| 2019/0228461 | A1* | 7/2019 | Domokos .......... G06Q 30/0201 |
| 2019/0236214 | A1 | 8/2019 | Kokernak |
| 2019/0236286 | A1 | 8/2019 | Scriber et al. |
| 2019/0236698 | A1 | 8/2019 | Postrel |
| 2019/0244241 | A1 | 8/2019 | Hain |
| 2019/0244243 | A1 | 8/2019 | Goldberg et al. |
| 2019/0244287 | A1 | 8/2019 | Datta et al. |
| 2019/0244291 | A1 | 8/2019 | Godell et al. |
| 2020/0058023 | A1 | 2/2020 | Travizano |
| 2020/0074461 | A1 | 3/2020 | Derosa-Grund |
| 2020/0126114 | A1* | 4/2020 | Kuo ................... G06Q 30/0241 |
| 2020/0234268 | A1 | 7/2020 | Kohli |
| 2020/0394723 | A1 | 12/2020 | Baker |
| 2022/0309540 | A1 | 9/2022 | Blaikie, III |
| 2022/0309541 | A1 | 9/2022 | Blaikie, III |

FOREIGN PATENT DOCUMENTS

| | | |
|---|---|---|
| EP | 3396612 A1 | 10/2018 |
| EP | 3472779 A1 | 4/2019 |
| WO | 2017007806 A1 | 1/2017 |
| WO | 2017190175 A1 | 11/2017 |
| WO | 2017197110 A1 | 11/2017 |
| WO | 2018007828 A2 | 1/2018 |
| WO | 2018013124 A1 | 1/2018 |
| WO | 2018058105 A1 | 3/2018 |
| WO | 2018142260 A1 | 8/2018 |
| WO | 2018165472 A1 | 9/2018 |
| WO | 2018197487 A1 | 11/2018 |
| WO | 2018197491 A1 | 11/2018 |
| WO | 2018204541 A1 | 11/2018 |
| WO | 2018209153 A1 | 11/2018 |
| WO | 2018211382 A1 | 11/2018 |
| WO | 2019051401 A1 | 3/2019 |
| WO | 2019058404 A1 | 3/2019 |
| WO | 2019083693 A1 | 5/2019 |
| WO | 2019094153 A1 | 5/2019 |
| WO | 2019099335 A1 | 5/2019 |
| WO | 2019113138 A1 | 6/2019 |
| WO | 2019121659 A1 | 6/2019 |

(56) References Cited

FOREIGN PATENT DOCUMENTS

| WO | 2019123416 A1 | 6/2019 |
| WO | 2019133309 A1 | 7/2019 |
| WO | 2019152732 A1 | 8/2019 |

OTHER PUBLICATIONS

International Search Report & Written Opinion, PCT/US2020/025495, Jul. 2, 2020, 15 pages.

International Search Report and Written Opinions, PCT/US2022/075985, Dec. 6, 2022, 12 Pages.

Saraji et al. "A blockchain-based carbon credit ecosystem." (2021 ). Jul. 1, 2021 (Jul. 1, 2021} Retrieved on Oct. 24, 2022 (Oct. 24, 2022) from . 12 pages.

International Preliminary Report, PCT/US2019/059920, May 20, 2021, 8 pages.

European Patent Office, Application No. 19882248.8, Search Report, Jun. 8, 2022, 13 pages.

Stephen Mckeon: "What is a blockchain token?", Aug. 29, 2018, XP055704371, 2 pages. Retrieved from the Internet on Jun. 12, 2020:URL:https://web.archive.org/web/20180829024901 /https://theconversation.com/what-is-a-blockchain-token-98916.

* cited by examiner

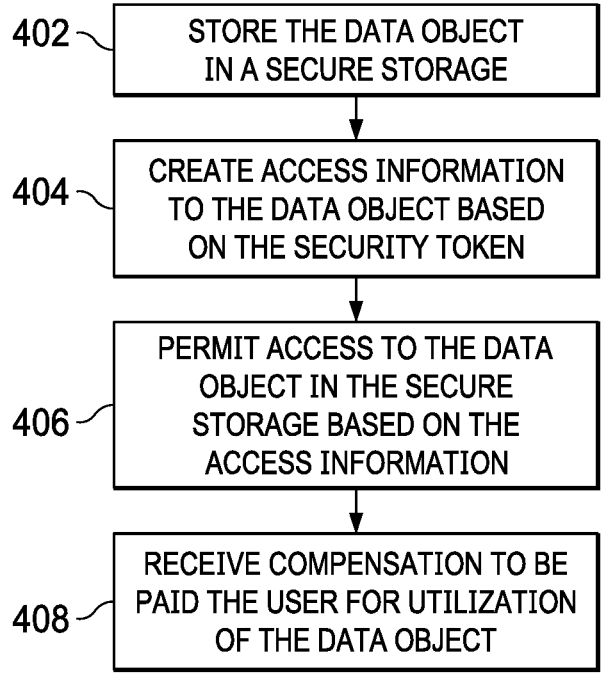

402 — STORE THE DATA OBJECT IN A SECURE STORAGE

404 — CREATE ACCESS INFORMATION TO THE DATA OBJECT BASED ON THE SECURITY TOKEN

406 — PERMIT ACCESS TO THE DATA OBJECT IN THE SECURE STORAGE BASED ON THE ACCESS INFORMATION

408 — RECEIVE COMPENSATION TO BE PAID THE USER FOR UTILIZATION OF THE DATA OBJECT

FIG. 4

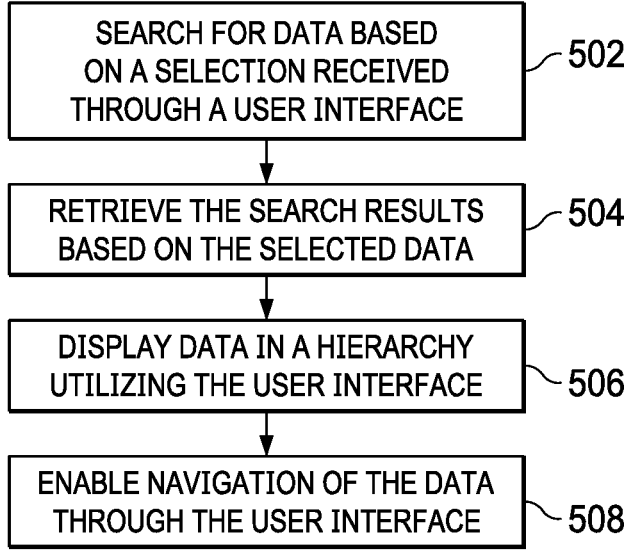

SEARCH FOR DATA BASED ON A SELECTION RECEIVED THROUGH A USER INTERFACE — 502

RETRIEVE THE SEARCH RESULTS BASED ON THE SELECTED DATA — 504

DISPLAY DATA IN A HIERARCHY UTILIZING THE USER INTERFACE — 506

ENABLE NAVIGATION OF THE DATA THROUGH THE USER INTERFACE — 508

METHOD AND SYSTEM FOR DATA VALUATION AND SECURE COMMERCIAL MONETIZATION PLATFORM

BACKGROUND

I. Field of the Disclosure

The illustrative embodiments relate to data management, valuation and monetization systems. More specifically, but not exclusively, the illustrative embodiments relate to a system, method, apparatus, and platform for the valuation, management, and utilization of objectified data objects

II. Description of the Art

In recent years, data security, cyber-attacks and big data breaches have led to the development of technology initiatives to secure data and make it available for users, including blockchain, cryptocurrencies, fire walls, and security and encryption technologies. These technologies have largely fallen short of protecting or properly capturing all the available consumer data. The commercial Internet is still largely dependent on digital advertisement revenue derived from user or personal data that is typically monetized through advertising and resulting consumer or commercial product sales. User data is being captured, searched and used in targeted ad revenue production and delivery by the big data companies. Search engines, web destinations, and physical real-world sources of data are abundant and grossly underserved in the fields of capture, valuation, and monetization. Big data companies collect, analyze, verify and sell consumer data across all known web environments. The data is monetized by collecting and tracking interactions across an array of platforms, sites, devices, questionnaires, surveys and so forth.

Often, the current mechanisms fall short in the ability to price the resulting data and do not provide accurate data capture or network or exchanges for data purchasing, development, and transaction. Consumers' online profile data is commonly generated and monetized from consumer web searches, profile data, social media profiles, and online surveys that generate revenue through advertisement delivery with no compensation to the actual owners of the data, the individual consumers/users, consumer groups, organizations, and data generators themselves.

SUMMARY OF THE DISCLOSURE

The illustrative embodiments provide a system, method, and platform for the valuation, management, and monetization of data. A selection is received from a user to monetize a data object associated with the user. Data associated with data object is compiled. A security token is generated referencing the data. The data object is monetized utilizing the security token in accordance with the selection. Another embodiment provides a data platform including a processor for executing a set of instructions and a memory for storing the set of instructions. The set of instructions are executed to perform the method described above.

Another embodiment provides a system for performing data monetization. The system includes a number of electronic devices execute a data application. The data application is configured to display data. The system also includes a data platform accessible by the number of wireless devices executing the data application through one or more networks. The data platform receives a selection from a user to monetize data associated with the user, compiles the data associated with the user, generate a security token associated with the data, and monetizes the data utilizing the security token in accordance with the selection.

In other embodiments, the data objects are monetized within an open exchange. Data validation may be performed through data objectification where the attributes, characteristics and format of data is identified and authorized by the user. Monetization based on open market exchange of data assets that are tokenized and converted into named traded assets of a data source provide compensation for objectified data assets that allows for the direct control, valuation and monetization of data (e.g., web data, application data, profiles, personal measurements, readings, video, audio, artificial intelligence etc.). Monetization is performed through a process that is achieved through data refinement, objectification, virtual reality tokenization, valuation, ticker assignment and open exchange transactions. Trades on the exchange can be executed privately or publicly utilizing digital currencies, hard currencies, charitable contributions, trades and credits. The earnings from a sale of data can also be directed by the seller to the benefit of one or more not-for-profit organizations and may be eligible for tax deduction that benefits the seller. Users may be rewarded for additional data uploads, updates, additions, amendments, surveys/questionnaire fulfillment, and so forth. The tokens may be utilized to pay a vendor or third party for a product, service, system, or data, secure a digital asset, tracking the life of an asset, share a stake in an asset or company, participate in an initial coin offering, receive a reward, maintaining and managing a digital asset, make a charitable contribution, or receive a tax deduction.

Also described are other alternative embodiments. In other embodiments, the selection may be an opt in received from the user. The method may further include validating and valuing the data object. The security token may be a blockchain-based token utilized by a blockchain platform. The selection may specify that the data object is monetized for one or more of a charity, tax deduction, offset to a cost, reward, and profit. The data object may include one or more profiles associated with the user, a website, an application, or a service. The method may include incentivizing and rewarding the user with additional tokens for providing additional data or updated data. The security token may be monetized through a payment to a vendor, payment between third parties, digital currency, tracking a life of an asset, purchasing a share or asset in a company, participating in an initial coin offering (ICO), exchanged for a reward, a charitable contribution or tax deduction. The validating and valuation are performed by artificial intelligence. The method may further include storing the data object in a secure storage and creating access information to the data object referenced in the security token. The method may further include permitting access to the data object in the secure storage in response to the access information. The method may further include permitting access to the data object in the secure storage in response to the access information. The method may further include sending a receipt of the purchase to the user indicating the purchase and the associated advertising, marketing or cause-based actions taken by the one or more businesses. The data for a number of users may be stored in a digital ledger. The platform may include a data refinery, a data vault, and a data exchange. The data exchange may be open to registered users. The data object may be dissociated from the user for securely managing the data for the user. The security token may be a blockchain token that includes an encryption key for accessing the key, and wherein the data is stored in a blockchain ledger in communication with the data platform.

BRIEF DESCRIPTION OF THE DRAWINGS

Illustrated embodiments are described in detail below with reference to the attached drawing figures, which are incorporated by reference herein, and where:

FIG. 4 is a flowchart of a process for managing compensation for data in accordance with an illustrative embodiment;

FIG. 5 is a flowchart of a process for displaying data in accordance with an illustrative embodiment;

DETAILED DESCRIPTION OF THE DISCLOSURE

Figure 1:
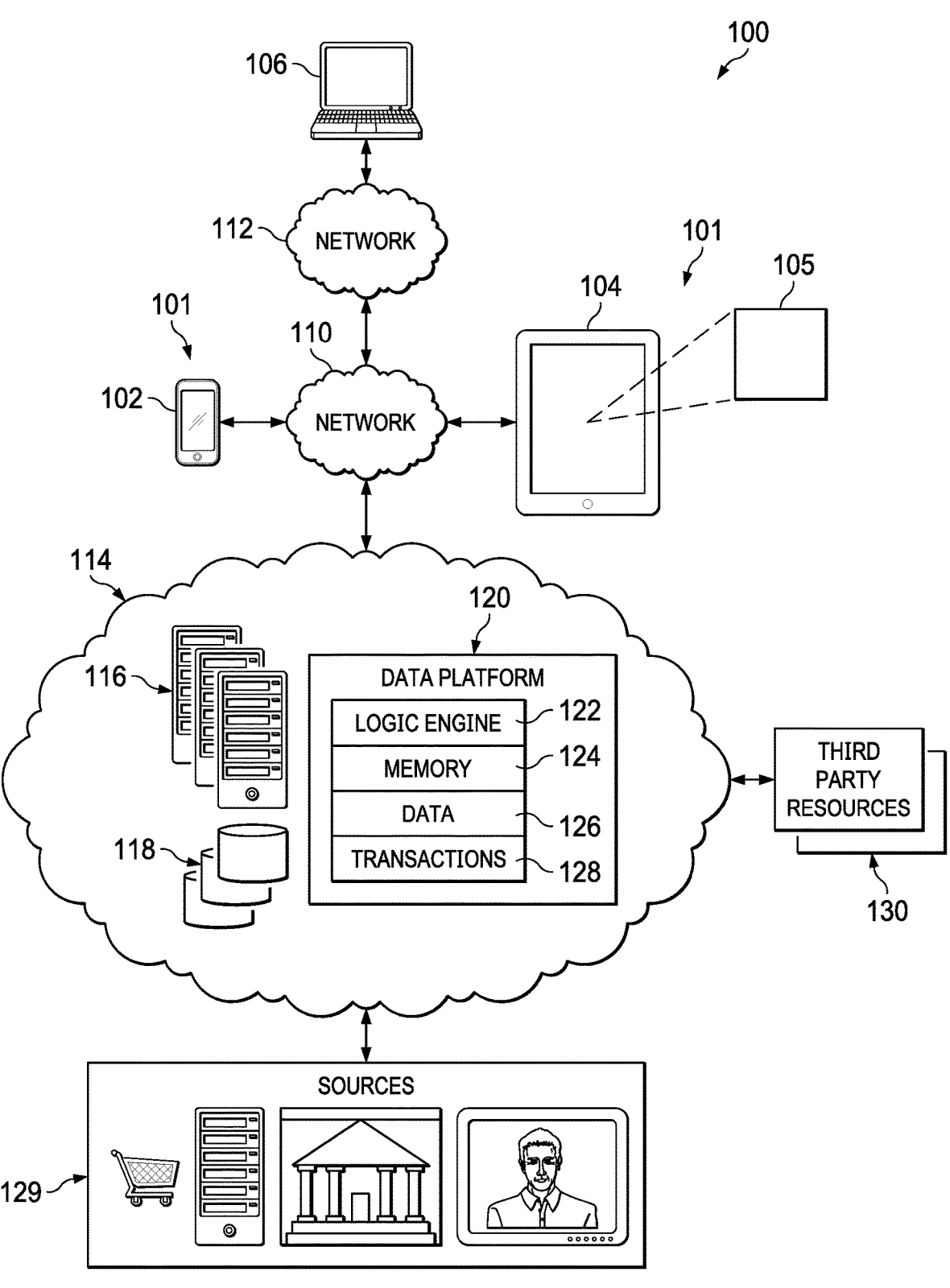
FIG. 1 is a pictorial representation of a system for managing user data in accordance with an illustrative embodiment.

The illustrative embodiments provide a system, method, platform, and network for encrypting, securing, valuating, developing, managing data valuations and monetization of objectified data through an open commodity or asset exchange. Data objects may be accessible from any number of authorized and connected devices. The illustrative embodiments allow users/consumers, consumer groups, companies, organizations, entities, governments, and other parties worldwide to develop data strategies that aid in and enable the conversion of any data into a common transactable objects. The created data objects are then characterized in a virtual reality where they are valued in currency. The conversion enables valuation of all types of data into any number of currencies and allows for the price to be set for the listing of the underlying data objects to be valued within a virtual reality and exchanged on a private or public exchange through direct or broker managed transactions. For example, this may include the curation, acquisition, development, creation, and market valuation of secured tokens to protect, monetized, control, and perform transactions with data. The illustrative embodiments may be utilized to donate the proceeds of data object sales or the data is utilized for tax benefits or to support charitable organizations. As a result, data owners are empowered with a system, method, and platform for capturing, identifying, valuing, monetizing, converting, utilizing, and improving data.

As referenced herein, data refers to historical, operational, live or incremental commercial data, including but not limited to database based data, video, audio, media, user profiles, web profiles, application profiles, mobile profiles and other information applicable to a user, consumer, entity, or other party. The data may be personal, commercial, or other types of data. The illustrative embodiments comply with all applicable data privacy and administration rules, laws, and best practices. Any number of mobile devices, computers, machines, servers, arrays, or so forth may be utilized to implement the illustrative embodiments. A user may objectify, value, tokenize and list upon an exchange data objects and enables conversion of all applicable data into data objects that may be controlled, valued, and monetized in commercial exchange transactions. The illustrative embodiments also provide the user the ability to control and value data generation and the seamless utilization and monetization of the data. For example, algorithmic processing may determine how and when online and digital data is utilized and monetized, the price point or fair data valuation based on applicable pricing (e.g., demographic, global, location, utilization, etc.) based on going rates, principles of supply and demand, market economics, market analysis, machine learning, exchanges, auctions, real-time bidding, artificial intelligence, and so forth. Relevant information regarding data utilization may be acquired in real-time, based on historical transactions/archives, a data futures market, buying and selling prices, or other applicable information or data that informs the value of a data sale or transaction. The illustrative embodiments allow the end user to select advertisement preferences that coincide with their demographics, opinions, behaviors, beliefs, social structure, environmental purchase plans, and real-world desires.

One embodiment provides a blockchain based securitized virtual reality where tokens representing refined data objects are valued within a user interface and that system gives users the ability to control, monetize, and/or choose to make proceeds donatable to charity or causes of their choice. The interface allows user to list any or all of the represented data objects upon a private or public exchange where the data is represented in a ticker or short name that provides price and object parameters for purchase. The proceeds from the sale of data are achieved when the ticker is purchased for the sale price, the securitized token is delivered to buyer, and data objects are made available for the buyer's access. The illustrative embodiments of the data refinery provide a curation of data objects that are collected from historical, or in real-time from data sources identified within the system and stored securely as data objects. The valuation of tokenized data objects are priced by the seller using clear compensation and renumeration guidelines and then listed to the exchange via short name or ticker that is made available for purchase to registered buyers. For example, any number of computing or communications devices, platforms, applications, or other data sources may be utilized in the capture and the refinement of data objects and those objects can be combined with public, non-public, third party or internal data sources to construct or develop hybrid data objects that are then listed by the seller upon the exchange.

The platform may generate security tokens that are representative of data objects and listed on private or public exchange and that are used as a device for the purpose of secure access and of monetization. Tokenization of data objects may represent any number of existing, custom/proprietary, and other data objects and are listed in ticker or short name form upon the exchange. In one embodiment, formatted, structured, or unstructured data objects are characterized, valued and represented in a secure and encrypted virtual reality-based tokens. The tokens enable access, valuation of the data underlying data objects that they represents, it includes a characterization of the data source, a reference and access to the precise data object and applicable data related to the pricing and buyer information related to the transaction in which tokens are purchased from the exchange. The security interest in a data asset may be represented in the form of a token representing a tokenized data point. Data across numerous fields and with different utilizations may be captured in a token (or tokenized). For example, intelligence, counterintelligence, consumer profiles, consumer/user, private, public, and other types of data may be captured and monetized. For example, the illustrative embodiments may provide a data management system that allows an asset, such as ownership of a digital profile to be tokenized as an asset that may be tracked, updated, grown, and expanded through an opt in submission from multiple sources and monetized digitally through an e-commerce or data futures platform.

The security tokens may be issued, regulated, managed, and distributed by a platform to comply with the existing regulatory framework of commodity and asset exchanges. The platform may provide a data monetization process for creating and performing transactions between buyers and sellers (e.g., similar to a stock trading or futures trading platform.). The illustrative embodiments may apply pricing based on a set price range, guidelines, industry-standard, or market rate. The data in the form of a token may allow the user to directly control and monetize their data in a transparent and secure blockchain platform. Consumers may receive security tokens in several ways when they sign up to participate in the system/service, when and where they opt in to include their data in the marketplace, and when corporations and/or third parties purchase or monetized access to their data. For example, the data may be managed within a self-directed and mobile computing environment. The illustrative embodiments allow users to determine how and when their data is shared, and monetized eliminating guesswork used by search marketing companies to user determined, approved, and desired consumer marketing data.

In one embodiment, the asset of data is created by the opt in submission of a user's social network profile(s), website utilization profiles, or generic/customized profile, and the associated data. The platform may be further used to secure all rights to any revenue streams associated with the data asset (e.g., any sale, sharing, or monetization of the user profile for a third-party, site, or advertiser). By opting into the program, the user is providing their profile and perfecting the profile to match their actual daily living and purchases of products and services. As a result, the illustrative embodiments put the user in full control of the use and monetization of their data while avoiding the erroneous or inaccurate use of information inherent in currently available advertising programs and systems. The illustrative embodiments improve known third-party unauthorized or non-monetized use of incomplete or inaccurate user data and enables the ability to provide an accurate user verified profile that creates a blockchain based method for user profile based monetized data streams. The platform provides numerous user benefits. Additionally, third parties gain the added advantage of better consumer profiling and targeting through the use of user profile confirmed and continually verified data.

The illustrative embodiments may enable the user to track utilization and monetization of their data and data profile in a more transparent fashion. As a result, the user may be able to access and track dividends, revenue sharing, price appreciation, or other forms of asset monetization. For example, a value-based reward system tracked utilizing blockchain may be implemented. Smart contracts may be utilized with blockchain to ensure proper utilization and monetization of the data for verification purposes. The secured token generation process of the user data/profile provides proof of ownership to the user and ensures contract conditions are written into the smart contract code within the blockchain structure. The blockchain records maintain and track the creation, issuance, management, and monetization of each token throughout the lifetime of the user's involvement and ownership of their data. In one embodiment, a user may be prompted, incentivized and rewarded with additional tokens for keeping their data/profile updated as well as for additional participation in surveys, watch a video, verify, a purchase, add studies, product marketing, expanded data provisioning, and questionnaires.

The user may be incentivized to provide additional data, such as pictures, audio content, videos, location (e.g., real-time, GPS, beacon, triangulation, delayed for safety, historical, etc.), Internet protocol address, identification of friends from each social network, sharing access to third-party applications, search data, views, likes, shares, comments, and so forth. As a result, the user may specify advertisement preferences that are associated with their demographics, opinions, behaviors, beliefs, social structure, purchase plans, and real-world desires. The user data that is recorded and stored may reside permanently on the blockchain, but typically only has a three-year lifecycle to be relevant. Thus, the user is incentivized to maintain, share, and update their data and associated profiles.

The data profile may be singular to a user or may be expanded to include deeper insights into a family, group of friends, employees, or other affiliated or associated groups. For example, a family circle profile may include an opt in for parents, children, grandparents, uncles, cousins, neighbors, family friends, and so forth. The data profile may be shared as a family asset between a partner, spouse, and children allowing the family data to be managed and monetized as a single asset. As a result, advertisers and others may get deeper insights into participating users. The illustrative embodiments manage the data collection, pricing, reconciliation, verification, payments, or so forth. Advertisers may be able to identify consumer data that is relevant to their campaign in order to provide direct incentives and/or monetization for users who provide specific advertiser-based insights.

The illustrative embodiments may also allow user to transfer or donate the revenue or value generated for a charitable deduction or associated tax deduction. Each of the described data components is 100% opt in with users being rewarded for sharing specific data points that are desirable to advertisers or other third parties. For example, users may opt-out of specific data points that the do not wish to share with advertisers. The data captured by the illustrative embodiments may be consolidated and purchased by advertisers who provide incentives, rewards, or donations in exchange for access to users and focus group data used for the mining of advertiser-based user insights, analytics, marketing, and advertisement targeting.

The illustrative embodiments may also be utilized to create a data index that catalogs user profiles, data sets, and data transactions. Advertisers may then select a pricing structure for each type of data profile component that is desirable to advertisers thereby creating a virtual market for advertisers to purchase real time user data. The changing values of the data may be tracked over time for specific user profiles, consumer groups, and data pools based on their value to advertisers. The use of security tokens tied to user profiles creates a marketable asset that gives greater validity to commercial uses of blockchain technologies and the security token market.

Security tokens may be generated by the platform and may utilize custom, established or traditional blockchain based token mining processes (but is not limited to these methods), for creating the value attributed to each generated token. The token value may be generated from revenue or other incentives provided by advertisers and others that provide the tokenized value for each token. The tokens may be generated and exchanged for actual currency, preferred stock options, stock warrants, bonds, exchange traded fund (ETF) shares, cryptic or, initial coin offerings (ICO), gift cards, vouchers, and other forms of compensation.

FIG. 1 is a pictorial representation of a system 100 for managing user data in accordance with an illustrative embodiment. In one embodiment, the system 100 of FIG. 1 may include any number of devices 101, networks, components, software, hardware, and so forth. In one example, the system 100 may include a smart phone 102, a tablet 104 displaying graphical user interface 105, a laptop 106 (altogether devices 101), a network 110, a network 112, a cloud system 114, servers 116, databases 118, a data platform 120 including at least a logic engine 122, a memory 124, data 126, and transactions 128. The cloud system 114 may further communicate with sources 129 and third-party resources 130.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 100 may be utilized by any number of users, organizations, or providers to aggregate, manage, review, analyze, process, tokenize, distribute, advertise, market, display, and/or monetize user data 126. For example, the data 126 may be utilized in marketing or advertisements for goods or services. In one embodiment, the goods and services represent any number of items, content, products, or services sold by a business, entity, organization, or entity. In one embodiment, the system 100 may utilize any number of secure identifiers (e.g., passwords, pin numbers, certificates, etc.), secure channels, connections, or links, virtual private networks, biometrics, or so forth to upload, manage, and secure the data 126, generate tokens, and perform applicable transactions. As noted, the system 100 may be a blockchain system that utilizes a digital ledger to document and track transactions involving the data 126 or utilization thereof. The devices 101 are representative of multiple devices that may be utilized by businesses or consumers. The devices 101 utilize any number of applications, browsers, gateways, bridges, or interfaces to communicate with the cloud system 114, platform 120, and/or associated components.

The wireless device 102, tablet 104, and laptop 106 are examples of common devices that may be utilized to receive and manage data 126 and perform transactions related thereto. Other examples of devices 101 may include e-readers, cameras, video cameras, audio systems, gaming devices, vehicle systems, kiosks, point of sale systems, televisions, smart displays, monitors, entertainment devices, medical devices, virtual reality/augmented reality systems, or so forth. The devices 101 may communicate wirelessly or through any number of fixed/hardwired connections, networks, signals, protocols, formats, or so forth. In one embodiment, the smart phone 102 is a cell phone that communicates with the network 110 through a 5G connection. The laptop 106 may communicate with the network 112 through an Ethernet, Wi-Fi connection, or other wired or wireless connection.

The cloud system 114 may aggregate, manage, analyze, and process data 126 and tokens across the Internet and any number of networks, sources 129, and third-party resources 130. For example, the networks 110, 112, 114 may represent any number of public, private, virtual, specialty, or other network types or configurations. The different components of the system 100, including the devices 101 may be configured to communicate using wireless communications, such as Bluetooth, Wi-Fi, or so forth. Alternatively, the devices 101 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112, 114 of the system 100 may represent a single communication service provider or multiple communications services providers.

The sources 129 may represent any number of web servers, distribution services (e.g., text, email, video, etc.), media servers, platforms, distribution devices, or so forth. In one embodiment, the sources 129 may represent the businesses that purchase, license, or utilize the data 126, such as advertising or marketing goods and services utilizing the system 100. In one embodiment, the cloud system 114 (or alternatively the cloud network) including the data platform 120 is specially configured to perform the illustrative embodiments.

The cloud system 114 or network represents a cloud computing environment and network utilized to aggregate, process, manage, sell, monetize, and distribute data 126 and support the associated transactions and utilization. The cloud system 114 may implement a blockchain system for managing the data 126. The cloud system 114 allows goods and services from multiple businesses, users, managers, or service providers to be centralized.

In addition, the cloud system 114 may remotely manage configuration, software, and computation resources for the devices of the system 100, such as devices 101. The cloud system 114 may prevent unauthorized access to data 126, tools, and resources stored in the servers 116, databases 118, and any number of associated secured connections, virtual resources, modules, applications, components, devices, or so forth. In addition, a user may more quickly upload, aggregate, process, manage, and distribute data 126 (e.g., profiles, updates, surveys, content, etc.) where authorized, utilizing the cloud resources of the cloud system 114 and data platform 120. In addition, the cloud system 114 facilitates distribution of data 126 for one or more tax benefits, charitable causes, transactions, or other implementations. The cloud system 114 allows the overall system 100 to be scalable for quickly adding and removing users, businesses, authorized sellers, cause-based information, analysis modules, distributors, valuation logic, algorithms, moderators, programs, scripts, filters, transaction processes, distribution partners, or other users, devices, processes, or resources.

Communications with the cloud system 114 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 114 may include any number of load balancers. The load balancer is one or more devices configured to distribute the workload of processing the uploaded data 126 as well as applicable transactions to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. For example, the cloud system 114 may offload verification of users that seek to be added to the system 100 along with applicable data 126 and information. Load balancing may be performed between automatic systems and devices as well as individual users. Other intelligent network devices may also be utilized within the cloud system 114.

The servers 116 and databases 118 may represent a portion of the data platform 120. In one embodiment, the servers 116 may include a web server 117 utilized to provide a website, mobile applications, and user interface (e.g., user interface 107) for interfacing with numerous users. Information received by the web server 117 may be managed by the data platform 120 managing the servers 116 and associated databases 118. For example, the web server 117 may communicate with the database 118 to respond to read and write requests. For example, the servers 116 may include one or more servers dedicated to implementing and recording blockchain transactions and communications involving the data 126. For example, the databases 118 may store a digital ledger for updating information relating to the user's data 126 as well as utilization of that data 126. The databases 118 may utilize any number of database architectures and database management systems (DBMS) as are known in the art. The databases 118 may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that content, personal, or transaction information is not improperly shared or accessed.

The user interface 105 may be made available through the various devices 101 of the system 100. In one embodiment, the user interface 105 represents a graphical user interface, audio interface, or other interface that may be utilized to manage data and information. For example, the user may enter or update associated data utilizing the user interface 105 (e.g., browser or application on a mobile device). The user interface 105 may be presented based on execution of one or more applications, browsers, kernels, modules, scripts, operating systems, or specialized software that is executed by one of the respective devices 101. The user interface may display current and historical data as well as trends. The user interface 105 may be utilized to set the user preferences, parameters, and configurations of the devices 101 as well as upload and manage the data, content, and implementation preferences sent to the cloud system 114.

In one embodiment, the system 100 or the cloud system 114 may also include the data platform 120 which is one or more devices utilized to enable, initiate, generate, aggregate, analyze, process, and manage data 126, transactions 128, and so forth with one or more communications or computing devices. The data platform 120 may include one or more devices networked to manage the cloud network and system 114. For example, the data platform 120 may include any number of servers, routers, switches, or advanced intelligent network devices. For example, the data platform 120 may represent one or more web servers that performs the processes and methods herein described.

In one embodiment, the logic engine 122 is the logic that controls various algorithms, programs, hardware, and software that interact to receive, aggregate, analyze, rank, process, score, communicate, and distribute data, content, transactions, alerts, reports, messages, or so forth. The logic engine 122 may utilize any number of thresholds, parameters, criteria, algorithms, instructions, or feedback to interact with users and interested parties and to perform other automated processes. The logic engine 122 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 124 is a hardware element, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data 126, transactions 128, instructions, and information. In one embodiment, the memory 124 and logic engine 122 may be integrated. The memory 124 may use any type of volatile or non-volatile storage techniques and mediums. In one embodiment, the memory 124 may store a digital ledger and tokens for implementing blockchain processes.

In one embodiment, the cloud system 114 or the data platform 120 may coordinate the methods and processes described herein as well as software synchronization, communication, and processes. The third-party resources 130 may represent any number of human or electronic resources utilized by the cloud system 114 including, but not limited to, businesses, entities, organizations, individuals, government databases, private databases, web servers, research services, and so forth. For example, the third-party resources 130 may represent advertisement agencies, marketers, e-commerce companies, and others that pay for rights to use the data 126.

In one embodiment, the data platform 120 may implement a blockchain ledger, manager, or technology. In another embodiment, the blockchain ledger may be accessible through sources 129. Any number of existing blockchain companies or providers may be utilized (Aeternity, Ethereum, Bitcoin, Dfinity, ContentKid, Blockphase, Chain of Things, Flowchain, Decissio, Cognate, SkyHive, Safe, etc.).

The blockchain is utilized as a way to store and communicate the data 126 along with transactions 128. The blockchain may utilized one or more distinct ledgers for different entities, services providers, types of data, users, or so forth. For example, each new user with data received by the data platform 120 is assigned a token or other secure identifier. In one embodiment, the digital tokens may be managed utilizing a key that allows the user or controlling party to access the ledger. In one example, the tokens may be controlled by the user or control may be reassigned. The blockchain may cross-reference updates to the data 126 with the original record for the data platform 120 to ensure proper maintenance, control, licensing, management, and transactions. In one example, different licensing tiers, pricing algorithms, license verification, cause information, and payments are combined to create a unique platform. The illustrative embodiments provide a system 100, cloud system 114, and data platform 120 for compiling businesses that support causes and documenting consumer transactions that support those causes.

The blockchain may also utilize any number of payment systems (e.g., PayPal, Venmo, Dwolla, Square, wire transfers, credit cards, Quicken, etc.) to fund a tokenized advertising or marketing campaign and to receive money and distribute payments to the applicable party. In one embodiment, the data platform 120 may receive a small fee or percentage per transaction, data uploaded/updated, data purchased, shared, or licensed, purchased item, browsing session, or so forth. In one embodiment, the data platform 120 may be utilized to verify users and advertisers (as well as other users/entities that utilize the data platform 120) and associated data 126 and transactions 128 associated with the data 126.

The third-party resources 130 may represent any number of electronic or other resources that may be accessed to perform the processes herein described. For example, the third-party resources 130 may represent government, private, and charitable servers, databases, websites, services, and so forth for verifying tax deductible or charitable donations of data. In another example, auditors may verify information provided by businesses with regard to the causes 128 associated with the businesses themselves or their associated data 126. Many segments of the global economy are data rich and include the business operations and individuals involved in the fields of retail, business, agriculture, non-profit and for profit organizations, healthcare, media, government, and finance that all create data that may be captured, tokenized and monetized by various embodiments as described herein.

In one embodiment the sources 129 may represent alumni, specialty clubs, and affinity groups or organizations that may participate to share or curate their data including user data and profiles. For example, the data may pertain to segmented groups with shared interests or activities that may be monetized. The usage of donations and the delivery of data valuations may be utilized for tax reductions. Various data and venue owners that access the data platform 120 may legally extract and tokenize the data 128 for use in the exchange provided by the system 100 by identifying and tracking data utilizing automatic data extraction tools.

In one embodiment, a user or consumer group represented by a user of the devices 101 or the sources 129 may elect and receive permission to collect observational data collected from secure and authorized systems to achieve access to partial or complete data from the sources 129 (e.g., professional drivers, human resources, prison records, property values, real estate sales, retail sales, retail prices, commerce, waste stream data, etc.).

The logic engine 122 may perform valuation of the data 126. For example, all the of the global resources and information, such as the price paid for data of all types and transactional data (e.g., micro transactions, cost per thousand, bulk sales, etc.) may be utilized to perform valuations. The logic engine 122 may also track and value accrual, sales, or transfers of data 126 between one or more companies to provide valuations as included in corporate transactions (e.g., acquisitions, mergers, stock purchases, buyouts, etc.). Companies, entities, or other organizations may also value their consumer data 126 and tie that value to their market capitalization providing public companies the ability to measure and place a valuation on corporate data reserves.

The logic engine 122 may process data feeds received to capture data 126 from companies that the value of consumer advertisements within the operations of Internet/data, television, radio, print, outdoor, and other advertising for automatic valuations. For example, the logic engine 122 may access sources 128 including data exchanges, markets, consultants, management systems, and so forth to determine the value of the data. For example, current and historical values for data may be determined and utilized in real-time. The data may be valued in a secondary data valuation and futures market exchange or the platform 120 itself may be utilized in a platform based valuation index and data exchange, similar to stock exchanges, except for the guided by global price guidelines, rules, and laws for the data industry. The data platform 120 may also make determinations of data utilization and valuation in the dark web to mitigate problems and provide additional potential for platform-based sales and services. In one embodiment, anonymous sources within an opt in system may be utilized to map data values and specific data requests posted and exchanged in the dark web along with the associated value to determine flow and monetization for minimizing potential risks.

The illustrative embodiments may also support third-party valuations of data. The validations may be performed by auditing groups, commissions, industry groups, or other professionals/entities. In one embodiment, the sources 129 may determine or verify data valuations. The data that is improved and/or validated may increase in value. Any number of artificial intelligence or computerized processes may be utilized to validate data. The sources 129 may also aggregate data 126 into portfolios. Portfolios of data may be managed, transferred, and otherwise utilized for the benefit of the data owners.

Data valuation may also be associated with geographic locations. The association of data with a location may be performed utilizing GPS data, location-based services, beacons, wireless triangulation, location-based services, tracking programs, interfaces, connections, protocols, video surveillance, or so forth. For example, by looking at the service locations, layouts, planograms, foot traffic of the venue and interpreting a data capture capability may help determine whether resources are justified or not.

The data platform 120 may provide any owner of data 126 an effective way to value the data. By automatically identifying the drivers of global data transaction valuations, the different stockpiles or silos of data ownership may be understood along with their corresponding value utilizing the data platform 120. The data 126 including groups of data may be utilized to perform fundraising, crowdfunding, or charitable work for a user or group. For example, a school fundraiser may allow people to donate their data 126 temporarily or indefinitely. In another example, an advertiser of a product line may partner with a fundraising group to provide marketing groups that participate in surveys or studies to like-minded consumer groups, mine data-based insights, such as demographic, political, family, business network, social network, religion, tastes, opinions, past and planned purchases, and other types of marketing-based questions. The donations or incentives may be determined by the size of the group who participate or based on other advertiser and profile ownership parameters.

In one embodiment, the logic engine 122 may utilize artificial intelligence. The artificial intelligence may be utilized to enhance data 126 and increase its value. For example, artificial intelligence may be utilized to review, authenticate, and validate data that is received by the system 100. The artificial intelligence of the logic engine 122 may be utilized to ensure that the data 126 is improved, accurately analyzed, and value increased. For example, it is expected that data and the associated tokens that are validated utilizing artificial intelligence may be given a premium value by both buyers and sellers.

The data 126 may also represent tracking of both real or intellectual property that may be assigned, managed, licensed, litigated, gifted, transferred, and so forth. For example, the data 126 may be transferred by wills, trusts, end-of-life conveyances, inheritances, liquidations, distributions, last wishes, designated beneficiaries, charitable donations, and other mechanisms used for real and intellectual property. Valuation of a "data estate" may also be performed by the data platform 120 as one of many potential valuations performed as part of the transactions 128. As a result, the data is treated like any number of valuable assets.

In another embodiment, the devices 101 may include any number of sensors, appliances, and devices that utilize real time measurements and data collection to update the data 126. For example, a sensor network, wearables (e.g., watches, bands, implantable devices, etc.) and Internet of things (TOT) devices may gather user and behavioral data.

The data platform 120 may also work in conjunction with hands-free data mining and measurement tools that tracks location, activity, and video-based marketing data (e.g., from GPS location, video from storefronts, beacon detection, proximity alerts, etc.) from any number of third-party sources. The user may be tracked through any number of environments, locations, and conditions. Beacons may be used for anonymous and specific data markers and commands. For example, a beacon may be utilized to generate a consumer interaction in which the consumer is asked to connect via social media to followers for the purpose of sharing and creating data 126 regarding a specified product or service.

The illustrative embodiments may allow data management to be outsourced from any number of users, businesses, or organizations to the system 100 and/or the data platform 120. For example, the data platform 120 may manage bulk data for a small business without the resources to fully analyze and monetize the data 126. The data 126 and the associated tokens may also be leveraged in times of crisis to obtain loans, provide donations, or otherwise benefit the users.

In one embodiment, the data platform 120 may extract data from third-party platforms by opting in and providing user credentials to various applications (e.g., Facebook, Twitter, Reddit, News Sites, Amazon, Google, etc.) the data platform 120 may extract data from the sources 129.

The data platform 120 may capture known data, behavioral information, psychological, mood data, and other intangible data. The data 126 may be validated through artificial intelligence, machine learning, human analysts/ consultants, or other automated or manual processes. For example, the system may be utilized to document participation and track results and side effects from a medical trial. The effective use of the data 126 may be rated for individuals, companies, facilities, or others. Data waste and data proficiencies may be managed through the data platform 120. For example, the data platform 120 may be utilized to determine counterfeits of products, brands through unique product mark documentation and identification via the blockchain.

Figure 2:
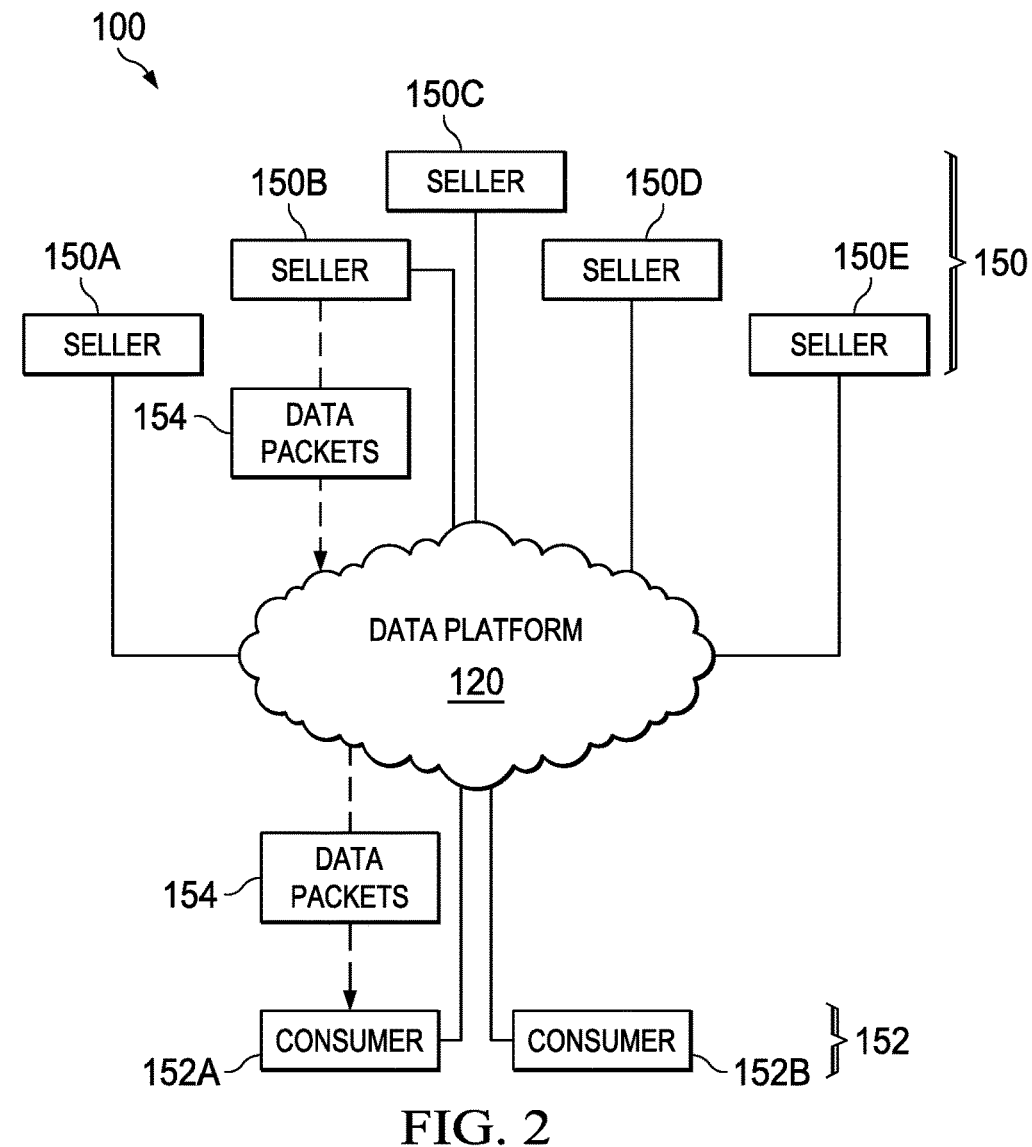
FIG. 2 further illustrates portions of the system of FIG. 1 in accordance with an illustrative embodiment.

FIG. 2 further illustrates portions of the system 100 of FIG. 1 in accordance with an illustrative embodiment. As shown the advertisers 150A-E (jointly advertisers 150) may represent the sources 129 of FIG. 1. The sellers 150 may represent any number of advertisers, marketers, businesses, retailers, service providers, individuals, organizations, entities, or so forth referred to as sellers 150 or businesses for purposes of simplicity. The consumers 152A, 152B (jointly consumers 152) represent any number of users, consumers, groups, or individuals that have data 154 that they are willing to allow the sellers 150 to access through the data platform 120. In one embodiment, the data platform 120 may represent all or portions of the system 100 of FIG. 1 (including the cloud system 114, servers 116, databases 118).

The consumers 152 may actively or passively incentivized or prompted to upload data 154 to the data platform 120. The data platform 120 may also receive amended, updated, or additional data 154 for the consumers 152 at any time as described herein. The consumers 152 may have an agreement for the distribution of the data 154 to the sellers 150 or other interest parties. The agreement or contract may specify how, when, and what portions of the data 154 may be used as well as the associated compensation terms. The agreement may specify that the data 154 may be purchased, licensed, rented, leased, or otherwise managed by the data platform 120 for the mutual benefit of the consumers 152 and the sellers 150. For example, the consumer 152A may elect to receive a one-time payment of tokens for data 154 provided to the data platform 120 for seller 150A. In another example, the consumer 152B may elect to license use of their data 154 such that they are compensated utilizing a digital currency (or hard currency) for each access of or utilization of their data 154 by the sellers 150.

The data platform 120 performs valuation of the data 154 based on information from any number of sources including current rates, contracts, indices, exchanges, and other applicable information. For example, current targeted advertisement rates may be utilized to value the data. The tokens paid to the consumers 152 in exchange for the data 154 may vary based on the volume, quantity, verification, and types of information included in the data 154. The data platform 120 normalizes data monetization for the consumers 152 and sellers 150. Compensation performed by the data platform 120 may be performed utilizing known cryptocurrency mining methods and may fund the tokenization through traditional funding utilizing digital currencies or existing currencies. In one embodiment, blockchain-based currencies may be utilized to compensate the consumers 152. Full tokens or partial tokens may be utilized to most accurately represent the values being exchanged. There may be a predefined number of tokens available thereby allowing early adopters of the system 100 to earn more over time. For example, in response to the consumer 152A selling the data 154 to the data platform 120 or the seller 150B, the consumer may be compensated with tokens (e.g., Bitcoin, Ethereum, proprietary tokens, etc.). All or portions of the data 154 may be involved in a transaction. For example, the data 154 may include numerous components relating to all aspects of the life, work, hobbies, entertainment, studies, politics, health, family, consumer habits, for the consumer 152B. The seller 150D may only license rights to temporarily (e.g., for one year) access the consumer habits of the consumer 152B existing and updated in real-time. The exchange for the tokens may include a pointer to a secure storage or vault accessed through the data platform 120. The pointer may be an encryption key, access information, unique identifier, or other security information for accessing the data 154 associated with the user. In another embodiment, security tokens used for the blockchain may also be embedded with the data 154. The tokens granted through the data platform 120 may vary in value, may be fixed, or may act similar to other monetary instruments (e.g., stocks, bonds, certificates of deposit, etc.) for a specified original value of the data 154.

The data platform 120, sellers 150, or consumers 152 may keep and maintain digital ledgers that track the transactions within the system 100 to verify and authenticate the data and associated transactions. The sellers 150 may utilize the data 154 to advertise, sell, or market goods, services, products, perform market research, generate analytics, or so forth. As previously noted, the data platform 120 may also represent one or more processing, analysis, blockchain, or distribution centers, systems, devices, facilities, or so forth. The sellers 150 and consumers 152 may represent any number of individuals or groups (e.g., hundreds, thousands, millions, etc.).

As noted, the sellers 150 may send or distribute goods and services 154 through the cloud system or directly to the consumers 152. In one embodiment, the seller 150B may distribute goods and services 154 to the consumer 152A through the data platform 120.

The data platform 120 may perform distribution of the goods and services 154. For example, the data platform 120 may include any number of physical storages, digital storage, warehousing, and distribution systems, facilities, professionals, employees, contractors, electronics, and so forth.

Figure 3:
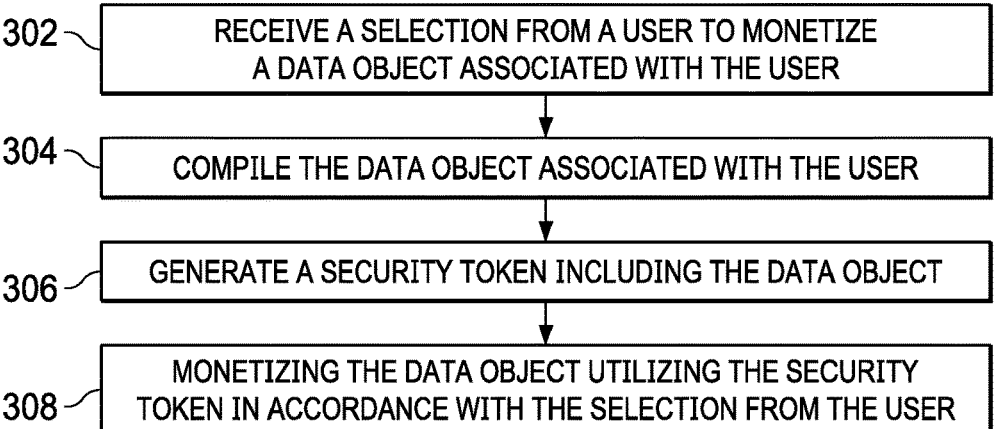
FIG. 3 is a flowchart of a process for monetizing data in accordance with an illustrative embodiment.

FIG. 3 is a flowchart of a process for monetizing data in accordance with an illustrative embodiment. The process of FIGS. 3-5 and 10 may be performed by a platform, device, server, or other equipment in accordance with illustrative embodiments. All or portions of the process of FIGS. 3-5 and 10 may be performed automatically. The process of FIGS. 3-5 and 10 may be implemented by a system or platform, such as the system 100, data platform 120, or devices 101 of FIG. 1 referred to generically herein as the platform.

In one embodiment, the process may begin by receiving a selection from a user to monetize a data object associated with the user (step 302). The selection may be an opt in selection made by the user. For example, the selection may involve the acceptance of financial or legal language utilizing a graphical user interface presented utilizing a web interface, mobile application, or so forth. The selection may be to monetize the data for the user himself/herself, a charity or cause, or for a third-party individual or group. In one embodiment, a profile associated with the platform may specify the types of data that may be captured as well as how the data object(s) may be utilized. For example, a platform profile may include any number of settings, configurations, parameters, selections, releases, authorizations, verification requirements, or other information and data that controls how the user's data is utilized in accordance with the illustrative embodiments. The user referenced in step 402 may also refer to a group of people, entity, organization, associated persons, or so forth. The data object may also be referred to as personal data, consumer data, private data, monetized data, authorized data, and marketing data.

Next, the platform compiles the data object associated with the user (step 304). As noted, the data object may include profiles, user selections, user input, sensory data, or other information and data actively or passively gathered about the user as objects, attributes, elements, fields, sets, pools, or other configurations of data. The profiles may be applicable to websites, mobile applications/programs, services, devices (e.g., smart phones, exercise equipment, vehicles, smart furniture, wearables, hearables, etc.), or so forth. The data object may be acquired over time based on the input, selections, activity, and other actions of the user. The data object may also be acquired in real-time. The data may include any number of categories, fields, or values that may be expanded over time to capture relevant information about the user in any number of fields, categories (e.g., amusement, work, school, sports, media, etc.), experiences and so forth. The data may include public, private, customized, and proprietary data permitted by the user.

Next, the platform generates a security token including the data object (step 306). In one embodiment, the security token is generated utilizing blockchain. The security token may include all or portions of the data object associated with the user. For example, one security token may incorporate information relating to the health, exercise, and nutrition of the user. In one embodiment, the security token is a form of digital currency that may be spent, exchanged, granted, transferred, or utilized for any number of purposes. For example, the user may be granted multiple tokens at once, over time, or is otherwise allocated based on the value associated with the data object in the security token and its utilization.

Next, the platform monetizes the data object utilizing the security token in accordance with the selection from the user (step 308). As previously noted, the data may be monetized through sale, license, royalty, rent, lease, exchange, pay-per-use, and other forms of commercialization. Any number of security tokens, digital currencies, or real currencies may be used in whole or partial values.

FIG. 4 is a flowchart of a process for managing compensation for data in accordance with an illustrative embodiment. FIG. 4 may be implemented with or as a separate portion of FIG. 3. In one embodiment, the process of FIG. 4 may begin by storing the data object in a secure storage (step 402). The secure storage may represent a vault, archive, secured server farm, or other secure mechanisms or locations. The secure storage may represent a secure server that is integrated with the user's network, system, architecture, platforms, or so forth.

Next, the system creates access information to the data object based on the security token (step 404). The access information may be utilized to access the data associated with a user. For example, a marketing or sales company may utilize the information from a user that has received compensation for their data.

Next, the system permits access to the data object in the secure storage based on the access information (step 406). The access may be granted in response to receiving the access information from the accessing party (e.g., business, processor, etc.). The data object may be communicated utilizing any number of secured channels, networks, tunnels, or so forth. In one embodiment, applications executed by the data platform and a device of the accessing party may be utilized to securely exchange data.

Next, the system receives compensation to be paid the user for utilization of the data object (step 408). The compensation may represent any number of digital currencies (e.g., tokens), real currencies, rewards, exchanges, and so forth.

FIG. 5 is a flowchart of a process for displaying data in accordance with an illustrative embodiment. In one embodiment, the user interface may be displayed or otherwise communicated by the platform. Any number of computing or communications devices may be utilized to view, manage, and utilized the user interface. The user interface may be utilized by any number of users to navigate the available data. For example, the data may be displayed to advertisers, marketers, research groups, or other individuals or parties interested in purchasing the data. The data applicable to the user interface of FIG. 5 may be displayed before or after a transaction for the data is implemented. The data may be communicated or displayed visually, audibly, In one embodiment, the process may begin by searching for data based on a selection received through a user interface (step 502). Any number of searches or inquiries may be performed by a user to retrieve applicable data (e.g., data objects, fields, data assets, data sets, data pools, etc.). For example, the welcome page may be presented to the user with a search field presented as part of a screen for window of the user interface. The user may also be presented with tutorials or additional information for navigating the user interface. The user interface may present any number of icons, hyperlinks, search windows, drop down menus, radio buttons, graphics, images, charts, tables, and interactive components.

Next, the platform retrieves the search results based on the selected data (step 504). The search criteria may include keywords, information, logical operators, symbols, index, or logic for performing searching of the data. For example, keyword, Boolean, associative, location, keyword, phrase, machine learning, or other searches/queries may be utilized. The searches may be applicable to specific demographics (e.g., age, gender, marital status, race, number of children, occupation, annual income, education level, homeowner, political affiliation, religious affiliation, nationality, etc.), interests, profile completeness, location, and so forth.

Next, the platform displays the data in a hierarchy utilizing the user interface (step 506). Any number of hierarchies or communication methods, techniques, and displays may be utilized. In one embodiment, the data may be displayed as assets in the form of a hierarchical tree that may be navigated (see FIG. 6). The hierarchy utilized may allow the user to understand the meaning of the data asset and its relationship to other data. For example, relationships between data may be displayed by the user interface. The hierarchy may include any number of categories, subcategories, links, graphics, associations, and so forth that may be navigated, expanded, contracted, or so forth.

Figure 6:
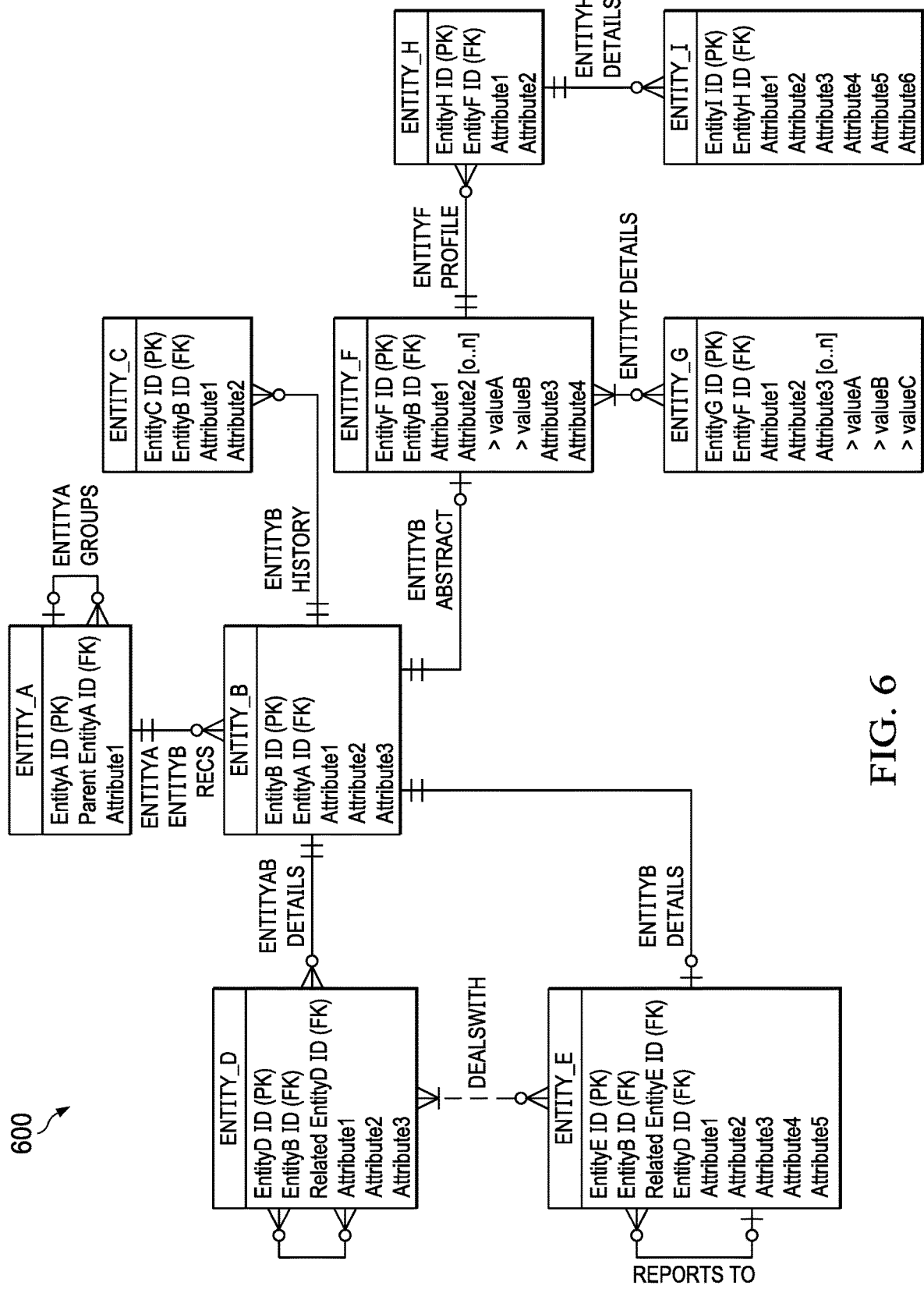
FIG. 6 is a pictorial representation of a physical data model in accordance with an illustrative embodiment.

FIG. 6 is a pictorial representation of a physical data model 600 in accordance with an illustrative embodiment. As previously noted, blockchain technologies may be utilized to manage and monetize the data. In one embodiment, an application program interface (API) may allow an individual or entity/company/group to capture and utilize data. The API may interface with existing programs to capture and manage applicable data. For example, the API may be integrated with a web browser, accounting software, database management software, and applications (e.g., blockchain, chat, word processing, spreadsheet, database, etc.).

Figure 7:
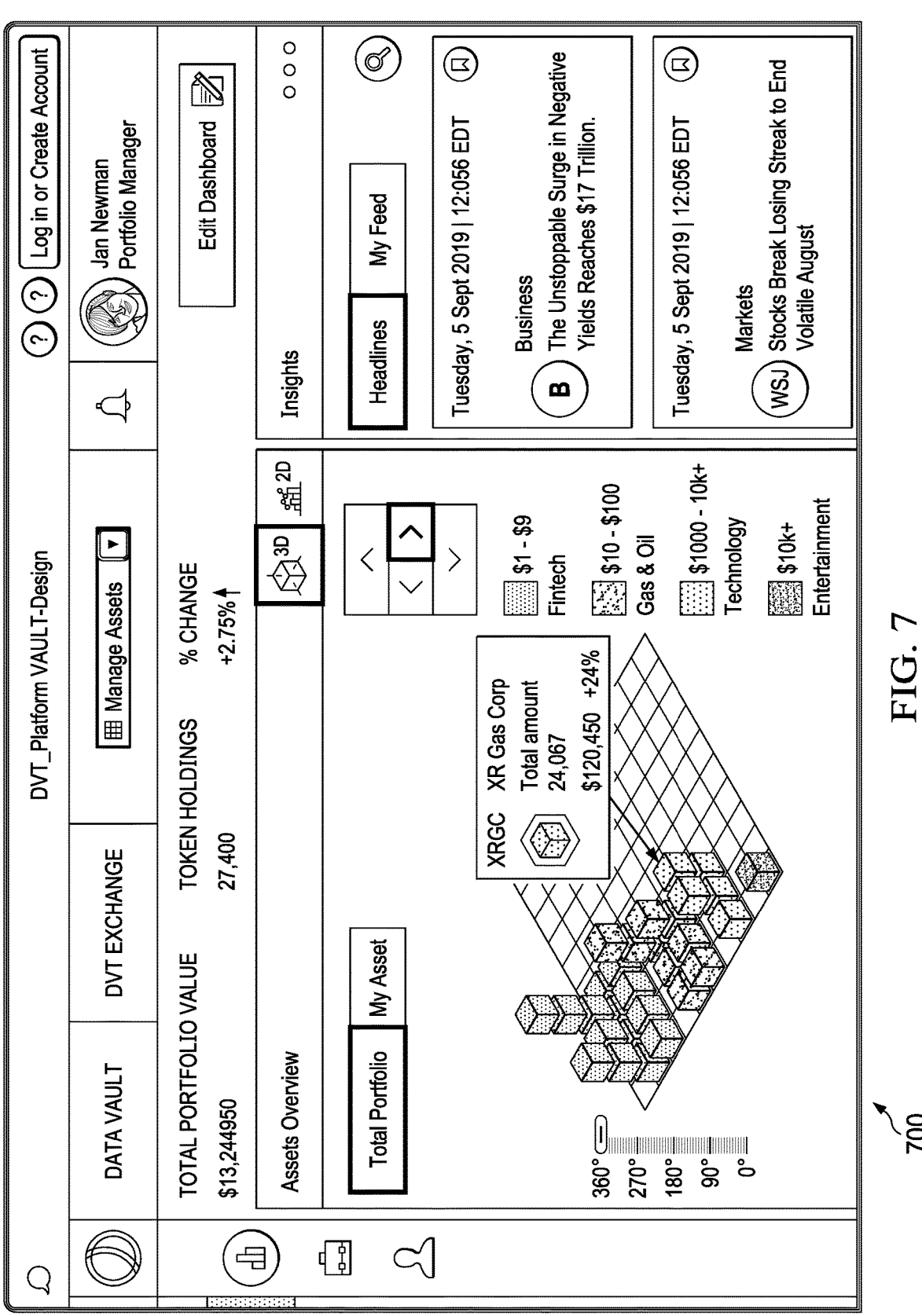
FIGS. 7 and 8 are pictorial representations of user interfaces in accordance with an illustrative embodiment.
Figure 8:
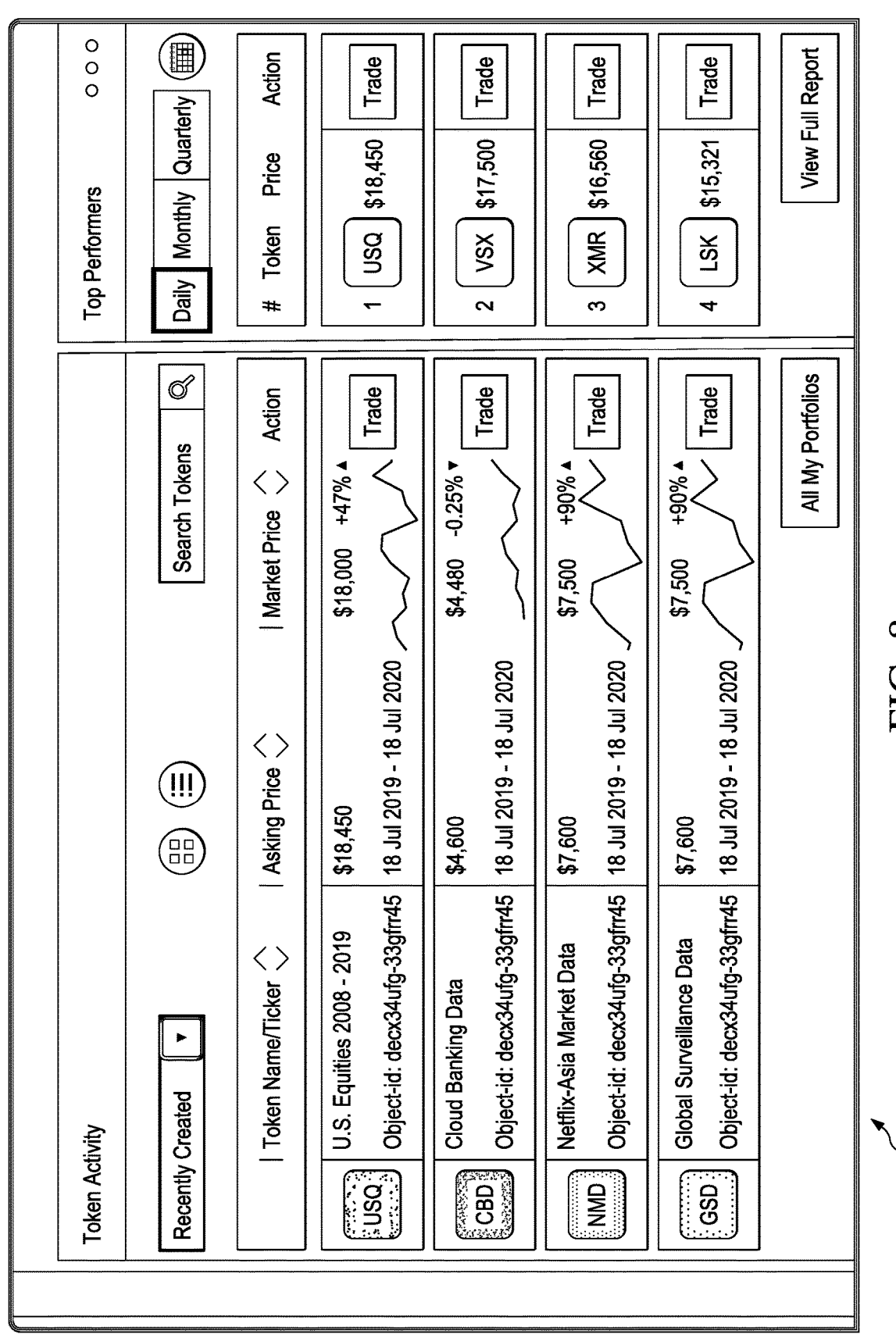

The physical data model 600 may be updated periodically, in real-time, or based on preset conditions. As shown, the physical data model may show Entities A-I and may incorporate tables, columns, data types, keys, constraints, permissions, indexes, views, and details on the allocation parameters available. Additional information and data may include identifications, parent entities, related entities, attributes, values, details, profiles, associations, and so forth. The physical data model 600 may be a compositions of host stem artifacts (e.g., physical data objects) that may be derived from a logical data model. The physical data model 600 may correspond to the data as stored in the ledger/database. The physical data model 600 may represent any number of data models FIGS. 7 and 8 are pictorial representations of a user interface 700 and 800 in accordance with an illustrative embodiment. The user interface 700, 800 may represent different views of a single user interface or multiple user interfaces. The user interface 700, 800 may represent one or more of a web browser, mobile application, desktop application, set of instructions, or so forth. In one embodiment, the user interface 700, 800 provides a dashboard for viewing saved and available data as well as an exchange/platform for communicating data. The data and information communicated through the user interface 700, 800 may be communicated visually (e.g., text, graphics, video, data, images, etc.), audibly, and/or tactilely. Any number of reports, graphics, and documents may be generated by the user interface 700, 800 to be sent (e.g., email, text, in-application message, hyperlink, etc.), exported, viewed, or utilized. The data and information may be displayed in two or three dimensions as selected by a user.

The user interface 700, 800 may allow a user (e.g., individual, company, entity, organization, etc.) to securely login to the platform. Any number of usernames, passwords, keys, encryption schemes, virtual private networks, standards, protocols, and so forth.

The user interface 700, 800 of the platform may allow the user to navigate available data assets. For example, the user interface 700, 800 may allow the user to search for specified users, types of data, data sets, data pools, and so forth. The data may be displayed using charts, graphics, images, text, and data in any number of formats. The user's tokens and associated value may be displayed by the user interface 700, 800. The user may purchase tokens and the associated data through the user interface 700, 800.

The user interface 700, 800 may also allow the user to view tokens held by the user. For example, the user may have sold her data or he company's data through an authorized transaction managed by the platform accessed through the user interface 700, 800. As previously noted, the data and tokens may represent personal data or commercial data. Different quantities of tokens may be granted based on the type of data. Alternatively, different types of tokens may be associated with different tokens. The user interface 700, 800

The user interface 700, 800 may be utilized to set any number of alerts for notifying the user regarding changes in token valuation, value, change percentages, anomalies, new data, trades (e.g., real-time, limit, margin, shorts, options, futures, etc.), and so forth. The user interface 700, 800 may include provide details, such as token name/ticker, asking price, market price, action, headlines, feeds, The available information and data may be displayed by the user interface 700, 800 using any number of time periods (e.g., daily, monthly, quarterly, yearly, custom periods, etc.).

The user interface 700, 800 may also display information and details regarding data providers that are in the news. A search field may also be utilized to search applicable information that may be displayed to the user interface 700, 800. Any number of windows, sub-windows, pop-ups, and so forth may be utilized or opened within the user interface 700, 800. The user interface 700 may include settings, configurations, parameters, or configurations that custom how, when, and what data, tokens, and information are displayed to the user.

Figure 9:
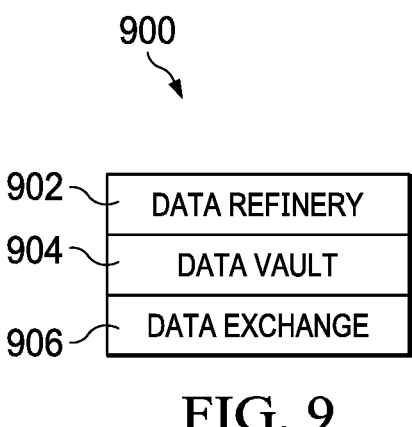
FIG. 9 is a pictorial representation of a platform 900 for monetizing data in accordance with an illustrative embodiment.

FIG. 9 is a pictorial representation of a platform 900 for monetizing data in accordance with an illustrative embodiment. The platform 900 may include a data refinery 902, a data vault 904, and a data exchange 906. The platform 900 of FIG. 9 may be representative of one or more devices, such as the servers 116, data platform of FIG. 1, or other smart networked device implementing specific hardware, software, firmware, and/or sets of instructions. The platform 900 including the data refinery 902, data vault 904, and the data exchange 906 may function as separate platforms or an integrated platform.

The data refinery 902 is utilized to create data objects and capture applicable data to include the data objects. In one embodiment, the data refinery 902 may be positioned within the user's existing system to capture data that is already received, entered, gleaned, or otherwise determined by the existing system. The data object may be created to store all, portions, or types of data associated with the user (e.g., individual, couple, family, company, organization, group, entity, etc.).

The data vault 904 is utilized to securely store the data objects and add, modify, and improve the associated data. In one embodiment, the data vault may be utilized to collect, characterize, and value the data. The data vault 904 may also determine the pace at which new data objects ae added or updated as well as the types of data. For example, the data vault 904 may determine that information relevant to two of the user's clients including company preferences for wireless services and legal services are added to the data vault 904 each day. The data vault 904 may be a physical or virtual storage and vault that securely stores information. In one embodiment, the data objects may be deidentified to remove identifying information to prevent hacking, identity theft, and other unwanted or prohibited utilization of data. The data vault 904 may also assign an initial value for the data object. The value may be associated with similar data, going rates, completeness of the data, the type of data, the user supplying the data, historical information, and so forth. The value may change at any time based on a determination of the platform 904 (i.e., the data vault or data exchange).

The data exchange 906 is utilized to price and perform transactions for the data objects. In one embodiment, the data exchange 906 creates a ticker associated with the data object. The ticker may be associated with the data object(s) for a user. The data exchange 906 allows the data objects to be priced and purchased. In one embodiment, exchange may utilize secure tokens to access the data. For example, transactions involving the data may represent a key for accessing the purchased or leased data. For example, the tokens may include an encryption key, password, biometric, or other secure identifier for accessing the data object from the data vault or other stored location.

Figure 10:
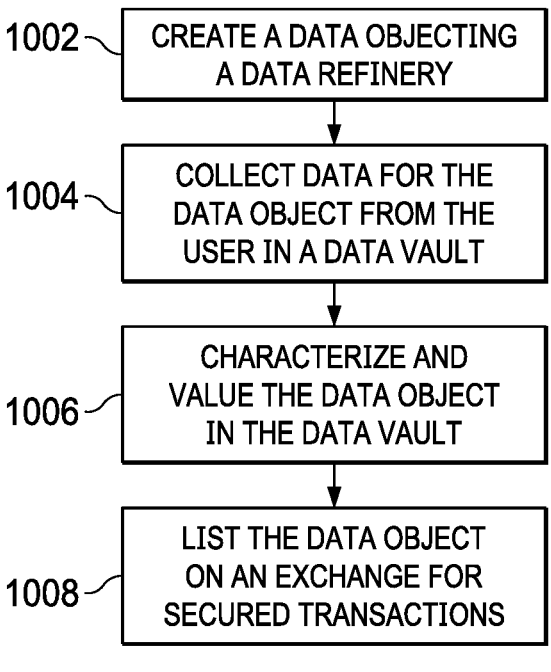
FIG. 10 is a flowchart of a process for monetizing data in accordance with an illustrative embodiment.

FIG. 10 is a flowchart of a process for monetizing data in accordance with an illustrative embodiment. The process of FIG. 10 may begin by creating a data object in a data refinery (step 1002). The data object may be associated with particular users and may include many distinct categories and types of data associated with one or more time periods. The data refinery may be physically or virtually integrated with the user's systems. For example, one or more networks and cloud devices and systems may be utilized for the process of FIG. 10.

Next, the platform collects data for the data object from the user in a data vault (step 1004). The data is collected and added to the data object. In some instances, new data may replace or modify old data to ensure that the data objects are up to date. In one example, the data object is a user profile.

Next, the platform characterizes and values the data object in the data vault (step 1006). The platform may determine when, how, and what types of data are received to characterize the data as well as the pace of received data. The platform may also value the data received. The value may represent a fixed and/or starting/initial value for the data object.

Next, the platform lists the data objects on an exchange for secured transactions (step 1008). The platform may utilize a ticker, such as GCO.1w or DDT.TCH1, to designate the user or type of data. The ticker may be utilized to perform any number of real-time, market, limit, short, option, or other transactions. Tokens traded may utilized the ticker to identify the data and access the data. For example, the tokens may include keys or indicators for accessing the data object. The exchange may represent an open exchange open to any number of lawful parties that are registered or otherwise authorized to perform transactions. During step 1008, the data assets may be tokenized and converted into named trading assets of a data source provider. The objectified data assets may allow of the direct control, valuation, and monetization of the data. Monetization may be performed through a process that is achieved through data refinement, objectification, virtual reality tokenization, valuation, ticker assignment, and open transactions as described for FIG. 10. Trades on the exchange may be executed privately or publicly utilizing digital currencies, hard currencies, charitable contributions, trades, and credits The illustrative embodiments provide a secure system, method, platform and devices for securing and maximizing the value of data into a tradable asset. Data may be collected, updated, aggregated, processed, analyzed, and utilized in real-time market conditions in a manner that is approved of and accepted by the user. For example, the collected data is disassociated from the user (herself, himself, itself) to prevent identity theft, corporate/organization/entity data theft, phishing, hacking or other forms of illegal, unscrupulous, or improper data theft or manipulation The data may be associated with a secure key accessed through a blockchain token to securely monetize the data for the benefit of the user. Any number of transactions may be performed utilizing a data exchange including transactions that are performed on exchanges, such as the New York Stock Exchange, Nasdaq, London Stock Exchange, Chicago Board Options, Exchange, and so forth. The platform may automatically match data with individuals, companies, entities, groups, or organizations who find the data most valuable and are willing to best compensate the user for the data. The transparent and open marketing of the data allows users to take back control of their data, how it is used, and how the user is compensated for providing their data in a very secure way.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 11:
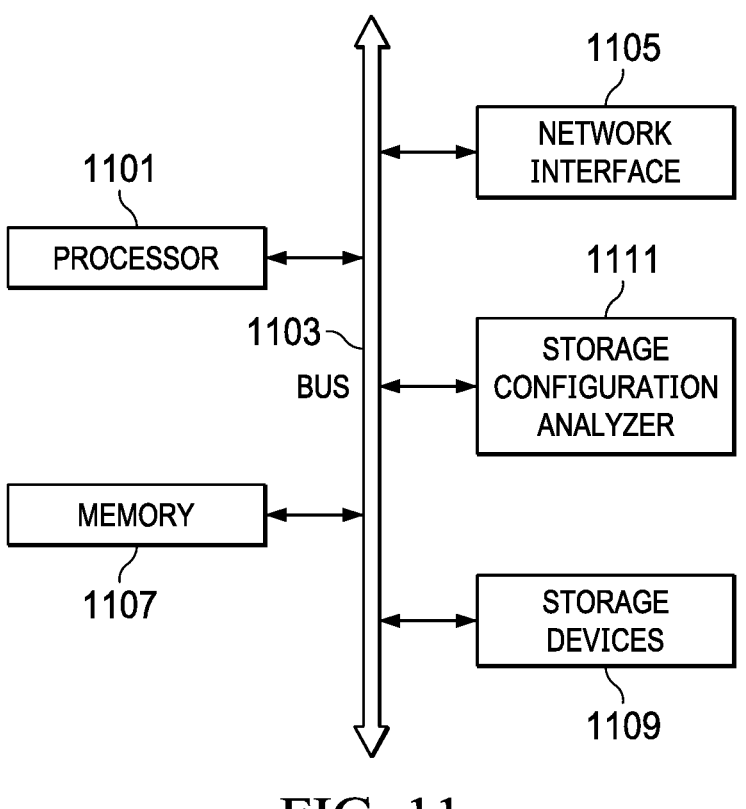
FIG. 11 depicts a computing system in accordance with an illustrative embodiment.

FIG. 11 depicts a computing system 1100 in accordance with an illustrative embodiment. For example, the computing system 1100 may represent a device, such as one or more of the devices 101 of FIG. 1. The computing system 1100 includes a processor unit 1101 (possibly including multiple processors, multiple cores, multiple nodes, and/or implementing multi-threading, etc.). The computing system 1100 includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 1103 (e.g., PCI, ISA, PCI-Express, HyperTransport®, InfiniBand®, NuBus, etc.), a network interface 1105 (e.g., an ATM interface, an Ethernet interface, a Frame Relay interface, SONET interface, wireless interface, etc.), and a storage device(s) 1109 (e.g., optical storage, magnetic storage, etc.). The system memory 1107 embodies functionality to implement embodiments described above. The system memory 1107 may include one or more functionalities that store content, blockchain data, parameters, application, user profiles, and so forth. Code may be implemented in any of the other devices of the computing system 1100. Any one of these functionalities may be partially (or entirely) implemented in hardware and/or on the processing unit 1101. For example, the functionality may be implemented with an application specific integrated circuit, in logic implemented in the processing unit 1101, in a co-processor on a peripheral device or card, etc. Further, realizations may include fewer or additional components not illustrated in FIG. 11 (e.g., video cards, audio cards, additional network interfaces, peripheral devices, etc.). The processor unit 1101, the storage device(s) 1109, and the network interface 1105 are coupled to the bus 1103. Although illustrated as being coupled to the bus 1103, the memory 1107 may be coupled to the processor unit 1101.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for monetizing data, comprising:
receiving a selection from a user specifying data associated with the user that is monetizable and how to monetize the data associated with a data object;
automatically compiling from a plurality of distinct sources the data associated with the data object according to the selection for utilization in a security token, wherein the data is associated with the user and enabled to include application data, financial data, and health data, and wherein the data is automatically compiled from a plurality of distinct sources with access to the data associated with the user;
validating and valuing the data prior to generating the security token;
generating the security token including a reference to the data object with the data associated with the user, wherein the security token is a blockchain token; and
monetizing the data object for at least the user utilizing the security token in accordance with the selection.

2. The method of claim 1, wherein the selection is an opt in received from the user.

3. The method of claim 1, further comprising:
validating and valuing the data object.

4. The method of claim 3, wherein the validating and valuation is performed by artificial intelligence.

5. The method of claim 1, wherein the security token is a blockchain-based token utilized by a blockchain platform.

6. The method of claim 1, wherein the selection specifies that the data object is monetized for one or more of a charity, tax deduction, offset to a cost, reward, and profit.

7. The method of claim 1, wherein the data object includes one or more profiles associated with the user, a website, an application, or a service.

8. The method of claim 1, further comprising:

incentivizing and rewarding the user with additional blockchain tokens for providing additional data or updated data for the data object associated with the security token.

9. The method of claim 1, wherein the security token is monetized through a payment to a vendor, payment between third parties, digital currency, tracking a life of an asset, purchasing a share or asset in a company, participating in an initial coin offering (ICO), exchanged for a reward, a charitable contribution or tax deduction.

10. The method of claim 1, further comprising:

storing the data object in a secure storage; and creating access information to the data object referenced in the security token.

11. The method of claim 10, further comprising:

sending a receipt of the purchase to the user indicating the purchase and the associated advertising, marketing or cause-based actions taken by the one or more businesses.

12. The method of claim 1, further comprising:

permitting access to the data object in the secure storage in response to access information.

13. The method of claim 1, further comprising:

receiving compensation to be paid the user for utilization of the data object.

14. A system for performing data monetization, comprising: a plurality of electronic devices executing a data application, the data application is configured to display data; and a data platform accessible by the plurality of wireless devices executing the data application through one or more networks, wherein the data platform receives a selection from a user specifying data associated with the user that is monetizable and how to monetize the data associated with the user, automatically compiles the data associated with the user from a plurality of distinct sources, validating and valuing the data prior to generating a security token, wherein the data is enabled to include application data, financial data, and health data, generate the a security token associated with the data, wherein the security token is a blockchain token, and monetizes the data for at least the user utilizing the security token in accordance with the selection.

15. The system of claim 14, wherein the data platform disassociates the data from the user for securely managing the data for the user.

16. The system of claim 14, wherein the security token is the blockchain token that includes an encryption key for accessing the key, and wherein the data is stored in a blockchain ledger in communication with the data platform.

17. The system of claim 14, wherein the selection specifies that the data is monetized for one or more of a charity, tax deduction, offset to a cost, reward, and profit, and wherein the data includes one or more profiles associated with the user, a website, an application, or a service.

18. A data platform, comprising:

a processor for executing a set of instructions;

a memory for storing the set of instructions, wherein the set of instructions are executed to:

receive a selection from a user specifying data associated with the user that is monetizable and how to monetize the data associated with a data object, automatically compile the data associated with the user from a plurality of distinct sources;

validating and valuing the data prior to generating the security token;

wherein the data is enabled to include application data, financial data, and health data;

generate a security token including the data associated with the user, wherein the security token is a blockchain token; monetize the data for at least the user utilizing the security token in accordance with the selection.

19. The data platform of claim 18, wherein the set of instructions are further executed to disassociate the data from the user for securely managing the data for the user.

20. The data platform of claim 18, wherein the security token is a blockchain token that includes an encryption key for accessing the key, and wherein the data is securely stored in a blockchain ledger in communication with the data platform.

* * * * *